United States Patent
Choufany et al.

(10) Patent No.: US 10,471,841 B2
(45) Date of Patent: Nov. 12, 2019

(54) ELECTRIC VEHICLE BATTERY THERMAL MANAGEMENT DEVICE

(71) Applicant: RENAULT s.a.s., Boulogne-Billancourt (FR)

(72) Inventors: Rany Choufany, Paris (FR); Fahri Keretli, Le Mesnil Saint Denis (FR); Amin El Bakkali, Guyancourt (FR); Igor Jovet, Lardy (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 597 days.

(21) Appl. No.: 14/902,929

(22) PCT Filed: Jul. 3, 2014

(86) PCT No.: PCT/FR2014/051713
§ 371 (c)(1),
(2) Date: Apr. 15, 2016

(87) PCT Pub. No.: WO2015/001266
PCT Pub. Date: Jan. 8, 2015

(65) Prior Publication Data
US 2016/0264018 A1    Sep. 15, 2016

(30) Foreign Application Priority Data
Jul. 5, 2013 (FR) ...................... 13 56629

(51) Int. Cl.
*B60L 58/26* (2019.01)
*B60L 11/18* (2006.01)
(Continued)

(52) U.S. Cl.
CPC ............ *B60L 11/1874* (2013.01); *B60K 1/04* (2013.01); *B60L 50/64* (2019.02); *B60L 58/26* (2019.02);
(Continued)

(58) Field of Classification Search
CPC ....... F28D 20/02; F28F 2265/14; H01M 2/12; H01M 10/52; H01M 10/65; H01M 10/613;
(Continued)

(56) References Cited

U.S. PATENT DOCUMENTS 3,817,322 A * 6/1974 Asselman ................. F01K 3/00
165/104.26
4,033,130 A * 7/1977 Hermans ................. F02G 1/055
126/400
(Continued)

FOREIGN PATENT DOCUMENTS

WO         01/61778 A2    8/2001
WO      2013/061132 A2    5/2013

OTHER PUBLICATIONS

International Search Report dated Dec. 2, 2014 in PCT/FR2014/051713 filed Jul. 3, 2014.
(Continued)

*Primary Examiner* — Keith M Raymond
*Assistant Examiner* — Gordon A Jones
(74) *Attorney, Agent, or Firm* — Oblon, McClelland, Maier & Neustadt, L.L.P.

(57) ABSTRACT

The invention relates to a device for the thermal management of a battery of electric accumulator cells assembled within a rigid casing, said device comprising thermal storage means incorporated into said battery comprising a chamber containing a phase-change material and having a volume for exchange of heat with said accumulator cells which is delimited by at least part of said casing, the melting of the phase-change material being able to store heat, and the solidification of the phase-change material being able to release the heat previously stored. According to the invention, said chamber is equipped at its distal end with an
(Continued)

expansion vessel able to absorb the expansions of said phase-change material as it changes phase.

10 Claims, 3 Drawing Sheets

(51) Int. Cl.
| | | |
|---|---|---|
| *B60K 1/04* | (2019.01) | |
| *H01M 10/6551* | (2014.01) | |
| *H01M 10/659* | (2014.01) | |
| *H01M 2/10* | (2006.01) | |
| *H01M 10/625* | (2014.01) | |
| *H01M 10/65* | (2014.01) | |
| *H01M 10/613* | (2014.01) | |
| *H01M 10/6562* | (2014.01) | |
| *F28D 20/02* | (2006.01) | |
| *B60L 50/64* | (2019.01) | |
| *B60K 1/00* | (2006.01) | |
| *H01M 10/0525* | (2010.01) | |

(52) U.S. Cl.
CPC .......... *F28D 20/02* (2013.01); *H01M 2/1077* (2013.01); *H01M 10/613* (2015.04); *H01M 10/625* (2015.04); *H01M 10/65* (2015.04); *H01M 10/659* (2015.04); *H01M 10/6551* (2015.04); *H01M 10/6562* (2015.04); *B60K 2001/005* (2013.01); *B60L 2240/545* (2013.01); *F28F 2265/14* (2013.01); *H01M 10/0525* (2013.01); *H01M 2220/20* (2013.01); *Y02E 60/122* (2013.01); *Y02E 60/145* (2013.01); *Y02T 10/705* (2013.01); *Y02T 10/7011* (2013.01)

(58) Field of Classification Search
CPC .......... H01M 10/625; H01M 10/6551; H01M 10/6562; H01M 10/659; H01M 2/1077; H01M 10/0525; H01M 2220/20; B60L 11/1874; B60L 50/64; B60L 58/26; B60L 2240/545; B60K 1/04; B60K 2001/005; Y02E 60/122; Y02E 60/145; Y02T 10/7011; Y02T 10/705

See application file for complete search history.

(56) References Cited

U.S. PATENT DOCUMENTS

| | | | |
|---|---|---|---|
| 2001/0033961 A1 | 10/2001 | Gudmundsson et al. | |
| 2003/0054230 A1 | 3/2003 | Al-Hallaj et al. | |
| 2006/0073377 A1 | 4/2006 | Al-Hallaj et al. | |
| 2011/0293986 A1* | 12/2011 | Kozu | H01M 2/105 429/120 |
| 2012/0171523 A1* | 7/2012 | Yang | H01M 10/5004 429/50 |
| 2013/0004806 A1* | 1/2013 | Wang | B60K 1/04 429/50 |
| 2013/0052490 A1* | 2/2013 | TenHouten | B60H 1/00278 429/50 |
| 2013/0192792 A1* | 8/2013 | Krakow | F28D 20/025 165/10 |
| 2014/0158340 A1* | 6/2014 | Dixler | F28F 27/00 165/287 |
| 2014/0248515 A1* | 9/2014 | Wayne | H01M 10/647 429/82 |
| 2015/0140367 A1* | 5/2015 | Yagi | H01M 10/6551 429/50 |

OTHER PUBLICATIONS

French Search Report dated Apr. 1, 2014 in FR 1356629 filed Jul. 5, 2013.

* cited by examiner

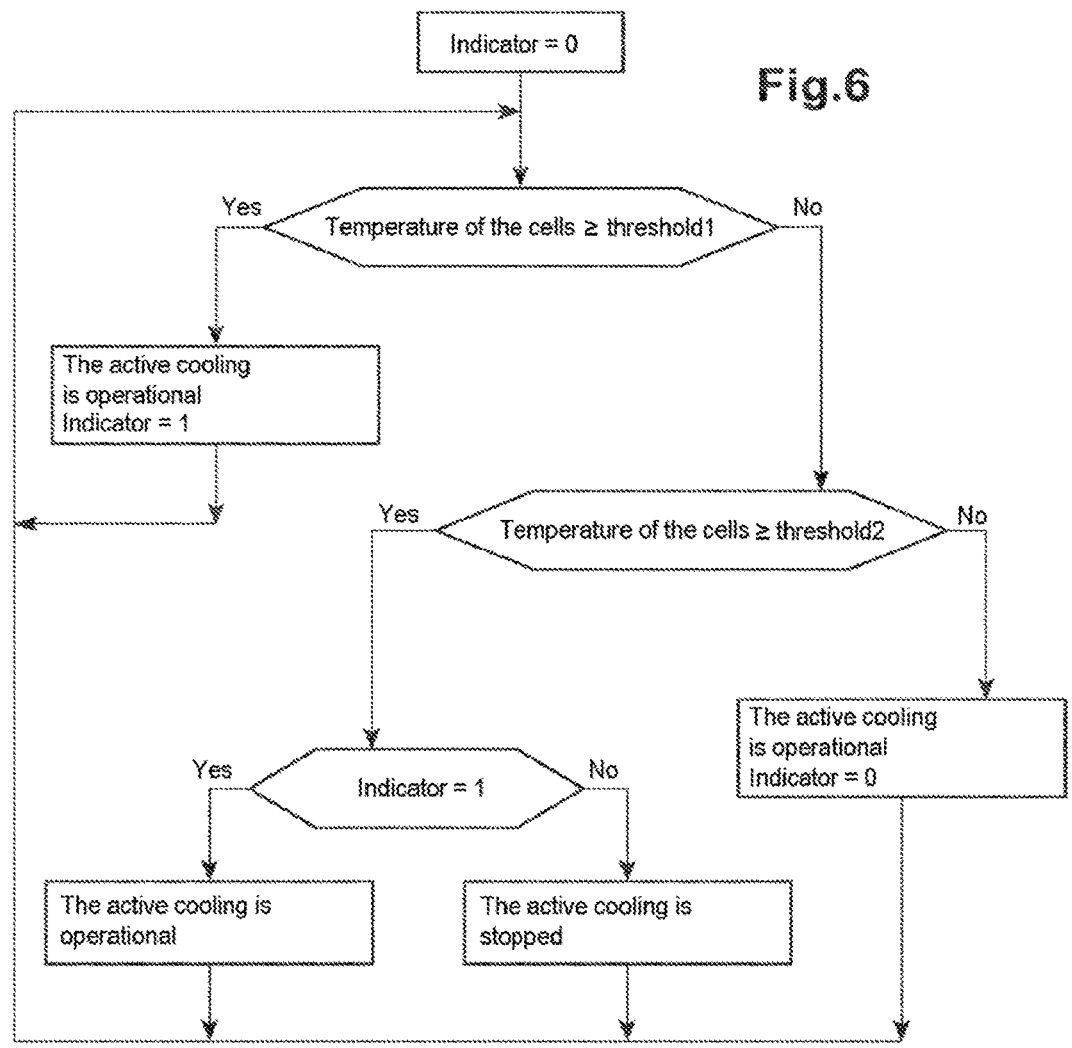

ELECTRIC VEHICLE BATTERY THERMAL MANAGEMENT DEVICE

CROSS REFERENCE TO RELATED APPLICATION

This application is a national phase application based on PCT/FR2014/051713, filed Jul. 3, 2014.

The present invention relates to a device for the thermal management of a battery of electric accumulators.

An envisaged field of application is in particular, but not exclusively, the thermal management of lithium-ion batteries, now widely used for the storage of the electrical energy necessary for supplying power to the electric motor of electric vehicles and of hybrid vehicles. This type of battery has a plurality of electric accumulators, or cells, including a rechargeable electrochemical system intended to provide a rated voltage. These cells can be assembled together in the form of modules each including a plurality of cells connected in series or in parallel, the modules being themselves interconnected in a predetermined configuration so as to form the battery. Such a battery is usually housed in a battery housing formed by a rigid casing enclosing the assembly of cells.

Lithium-ion technology, however, requires the capability of keeping the temperature of the battery within an optimal temperature range, typically comprised between 20° C. and 35° C., so as to preserve the service life of the battery. Operation of the battery beyond this range accelerates the ageing of the battery and reduces the energy storage capacity thereof.

The rise in the temperature of the battery may be caused either by the rise in the ambient temperature, or by the production of heat by the battery itself, due to the internal resistance thereof. Thus, a battery that provides 40 kW of electrical power will also produce approximately 2 kW of thermal power, which must be removed.

An overshoot of the maximum temperature limit results in a limitation of the power demanded of the battery so as to reduce the thermal power generated and thus return the temperature to within the admissible range, this being referred to as the "derating" of the battery. The higher the ambient temperature and the power demanded of the battery, the greater the risk of "derating". By way of indication, "derating" is applied when the temperature of the battery exceeds 48° C. It can be easily understood that "derating" reduces the performance of the vehicle in terms of speed and acceleration, which is not perceived favorably by the client.

Also, the traction batteries of electric vehicles and of hybrid vehicles have means for regulating their temperature. As is known, the batteries are routinely cooled by air pulsed by fans. Thus, the external air at low temperature is pulsed in the battery and escapes via the extractors after having absorbed heat by means of convection. It is understood that this cooling device reaches its limits when the ambient temperature is high and/or the thermal power generated by the battery is considerable. In fact, a small difference in temperature between the cooling air and the battery signifies a low capacity to remove the heat produced by the battery.

It is also known to use an air-conditioning system in order to lower the temperature of the air used to cool the battery. In this case the air firstly passes through an evaporator of an air-conditioning system before being pulsed in the battery.

However, whether the battery is cooled by pulsed external air or by chilled air, these devices result in a consumption of energy by the power supply of the actuators (fan, compressor of the air-conditioning system, etc.), which reduces the autonomy of the vehicle. In the case of cooling by chilling, another disadvantage of the device is the risk of degradation of the thermal comfort in the interior of the vehicle, since some of the cooling produced by the air-conditioning system is diverted from the interior and is directed to the battery. It would be possible to remedy this second drawback by installing in the vehicle an air-conditioning system dedicated to the battery, but this would result in a rise in the cost of the vehicle.

In addition, a device for regulating the temperature of the battery comprising a thermal storage means directly integrated in the battery and which uses the latent heat of melting of a phase-change material (PCM) to absorb at least some of the heat generated by the cells of the battery is known from patent document US2006/0073377. In accordance with this document the cells of the battery are embedded within the phase-change material, which is disposed within the rigid casing enclosing the battery, so as to fill the empty spaces existing between the adjacent cells. Thus, the heat generated by the cells can be stored in the phase-change material in the form of latent heat so as to perform the phase change of the material. The phase change of the material results in a variation of the density and thus volume thereof. In accordance with document US2006/0073377, the use of the phase-change material in order to manage the temperature of the battery is provided within a fixed volume, corresponding to the empty spaces between the cells of the battery, whereas the material changes volume when it changes phase, so as to either store heat (melting of the material) or release the heat stored previously (solidification of the material).

A drawback of the system for regulating the temperature of the battery described in document US2006/0073377 is that, during the cooling, the phase change involves a reduction of the volume of the material, resulting in a risk of loss of the thermal contact between the material and the cells or, at the least, a reduction of the heat exchange surfaces between the material and the cells, this being translated by a degradation of the thermal regulation performance. In addition, in the event of reheating under the effect of the heat released by the cells, the material being constrained in a fixed volume, the phase change of the material is influenced, resulting in a risk of overheating of the material and/or a risk of damage to the rigid casing enclosing the battery as a result of overpressure.

In this context the object of the present invention is to propose a device for the thermal regulation of a battery of accumulators, said device being devoid of at least one of the above-mentioned limitations.

For this purpose, the present invention proposes a device for the thermal management of a battery of electric accumulators assembled within a rigid casing, said device comprising thermal storage means integrated into said battery comprising a chamber containing a phase-change material and having a volume for exchange of heat with said accumulators which is delimited by at least part of said casing, the melting of the phase-change material being able to store heat, and the solidification of the phase-change material being able to release the heat previously stored. In accordance with the invention said chamber is equipped at its distal end with an expansion vessel able to absorb the expansions of said phase-change material as it changes phase.

Thanks to this arrangement, in solid phase, the phase-change material can fully fill the useful volume of the thermal storage chamber where the exchanges of heat occur, thus enabling an optimal thermal efficacy of the system, whilst enabling the chamber to withstand the variations in volume induced by the melting of the phase-change material, making it possible to store the heat released by the accumulators at constant temperature.

In accordance with further advantageous features of the thermal management device according to the invention, taken individually or in combination:

- Said expansion vessel is raised relative to said chamber and has an internal volume extending said heat exchange volume of said chamber from a lower end of said expansion vessel to an upper closed end of said expansion vessel, which is opposite said lower end;
- The interior of said expansion vessel is in communication with the exterior by means of a channeling open to the ambient air, said channeling being arranged in an upper part of said expansion vessel;
- Said channeling open to the ambient air is connected to a conduit able to raise the connection to the ambient air;
- Said chamber comprises an upper wall made of a heat-conducting material formed by said at least one part of said casing and forming a first surface for exchange of heat with said accumulators and a lower wall made of a heat-conducting material, disposed opposite said upper wall so as to close said heat exchange volume, said outer wall forming a second surface for exchange of heat with the exterior of said battery;
- Said chamber comprises heat exchange fins integrated on the surfaces of said upper and lower walls of said chamber;
- An active cooling system is associated with the thermal storage means, comprising a cooling circuit installed in said battery, equipped with means for circulating a cooling fluid through said battery;
- Control means of said active cooling system are able to control the activation of said active cooling system when the temperature of said accumulators reaches a first temperature threshold greater than the melting point of said phase-change material and able to control the stopping of said active cooling system when the temperature of said accumulators reaches a second temperature threshold comprised between the melting point of said phase-change material and said first threshold.
- The melting point of said phase-change material is substantially approximately 35° C.
- Said phase-change material is of the paraffin type.

Further features and advantages of the invention will become clear upon reading the description provided hereinafter of a particular embodiment of the invention, given by way of indication but not in a limiting manner, with reference to the accompanying drawings, in which.

Figure 2:
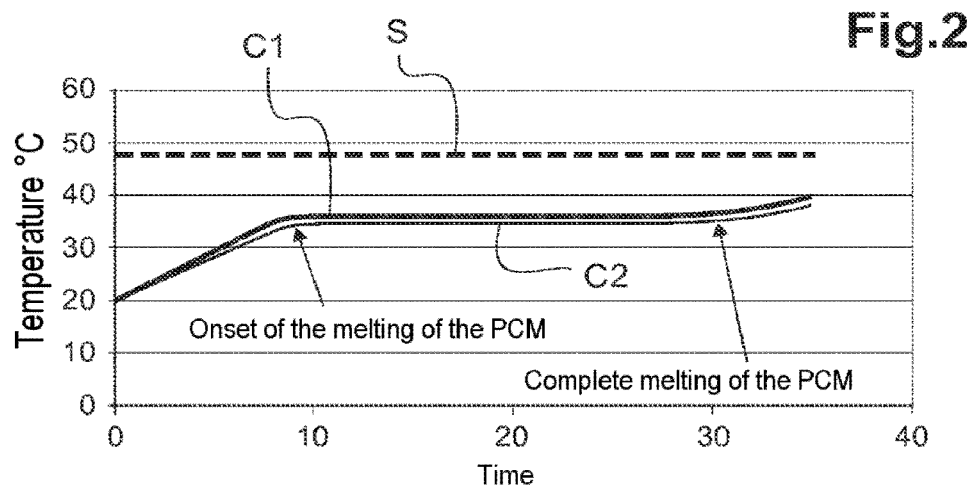
FIG. 2 is a diagram illustrating the variation in the temperature curves of the cells of the battery and of the phase-change material over time in the event of use of the vehicle.
Figure 3:
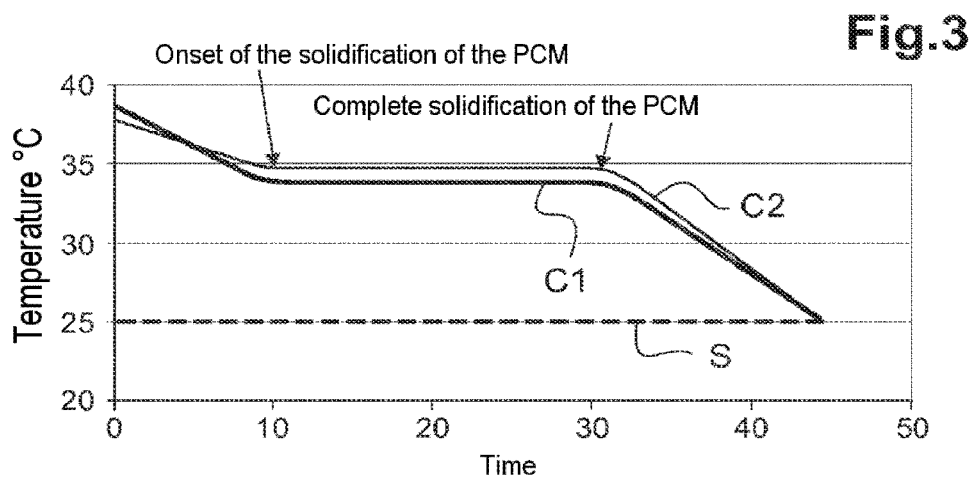
Figure 4:
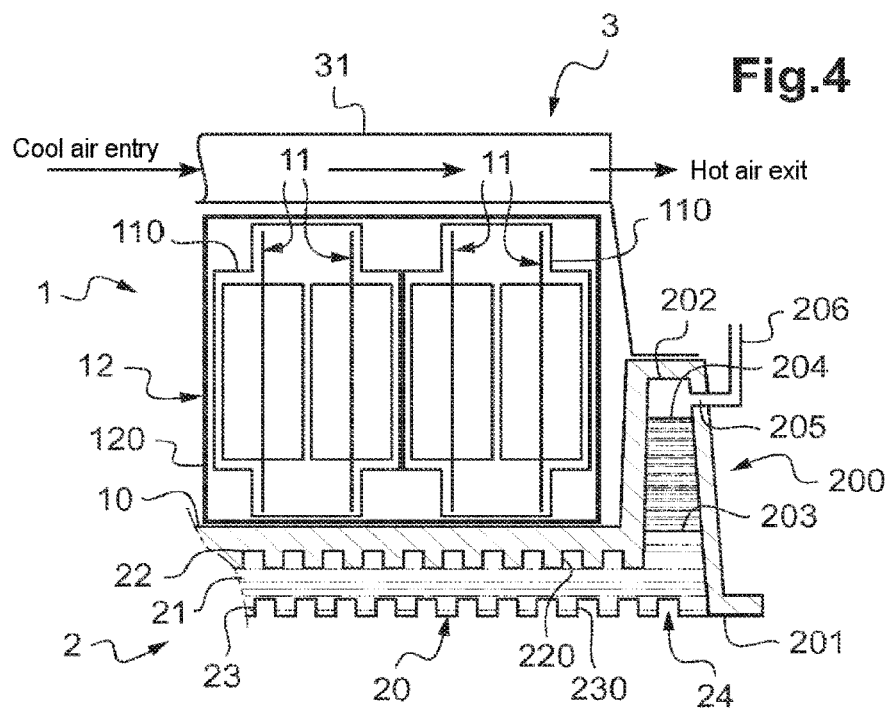
Figure 5:
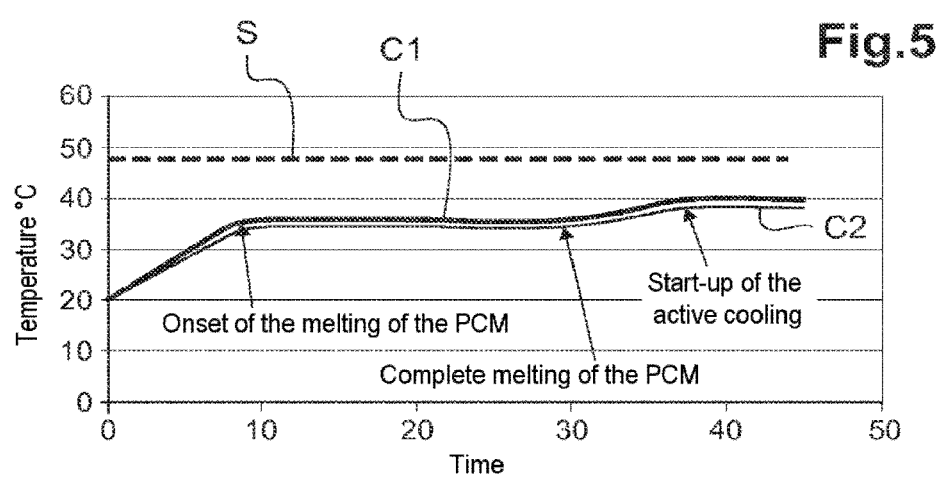

FIG. 3 repeats the diagram of FIG. 2 when the vehicle is not in use;

FIG. 4 is a diagram illustrating an embodiment of the battery thermal management device according to the present invention, combining an active cooling system with thermal storage means;

FIG. 5 is a diagram illustrating the variation of the temperature curves of the cells of the battery and of the phase-change material over time in the event of use of the vehicle and in the presence of active cooling means;

FIG. 6 is a flowchart illustrating an operating mode for controlling the active cooling means.

Figure 1:
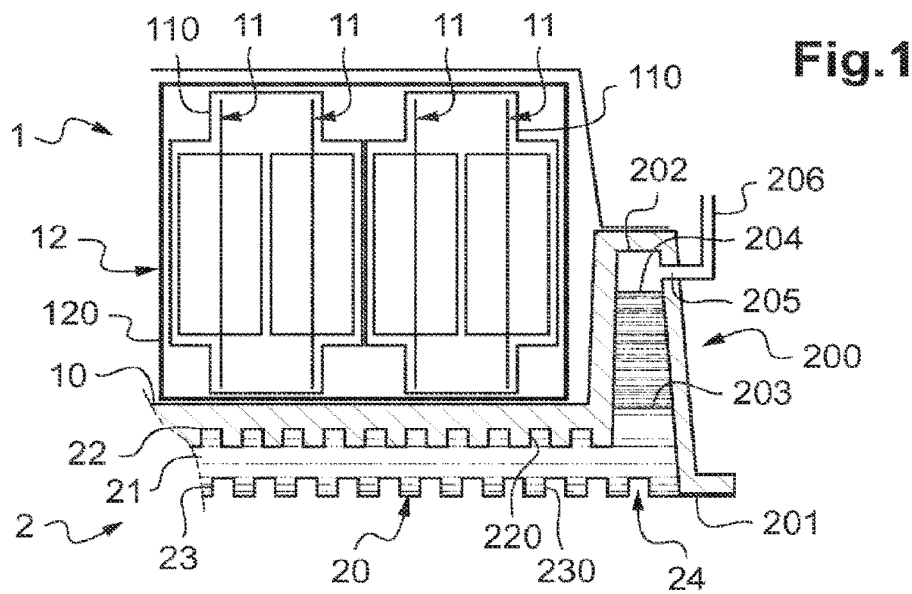
FIG. 1 is a diagram illustrating a preferred embodiment of the battery thermal management device according to the present invention.

FIG. 1 illustrates a portion of a battery pack provided with a battery housing 10 formed of a rigid casing, for example made of an aluminum alloy, intended to enclose a battery 1 of electric accumulators 11, or cells, of the lithium-ion type. In accordance with the exemplary embodiment, the cells 11 are assembled in twos by means of a metal shell 110 able to ensure the mechanical support of the cells and thermal conduction thereof, and four cells 11 thus assembled form a module 12, of which the metal casing 120 is in thermal contact on the one hand with the battery housing 10 and on the other hand with the metal shell 110 of the assemblies of cells 11. Such modules, of which only one is shown in FIG. 1, are assembled to form the battery pack.

In accordance with the invention, thermal storage means 2 using the latent heat of melting of a phase-change material are directly integrated into the battery. The thermal storage means 2 have a chamber 20 made of a metal material having a good coefficient of conduction, said chamber 20 containing a phase-change material (PCM) 21. The phase-change material 21 is for example a paraffin having a melting point capable of keeping the battery temperature in its optimal temperature range. Also, a paraffin of which the melting point is substantially 35° C. will be selected by way of preference. The chamber 20 for storing the phase-change material 21 is arranged relative to the battery so as to make it possible to optimize the exchange of heat between the cells 11, the phase-change material 21 and the exterior of the battery, whilst maintaining the most compact and the most simple architecture possible.

To do this, the chamber 20 is assembled with the battery 1 so as to cover a lower face of the battery 1, said chamber thus being in thermal contact with the metal casing 120 of the modules 12 via the metal casing of the battery housing 10 and therefore with the metal shell of the assemblies of cells 11. More precisely, the chamber 20 comprises a wall 22, referred to as the upper wall, forming a heat exchange surface on the side of the cells 11 of the battery 1, formed by the battery housing 10 itself, which thus serves as a casing both for the battery 1 and for the phase-change material 21. The battery housing 10 thus ensures direct thermal conduction between the modules 12, and therefore the cells 11 of the battery 1, and the phase-change material 21 contained in the chamber 20. The chamber 20 also has a wall 23 made of metal material, referred to as the lower wall, opposite the upper wall 22, forming a heat exchange surface on the outer side and which closes the heat exchange volume of the chamber 20 surrounding the phase-change material 21.

Heat exchange fins 220, 230 preferably of parallelepipedic shape are integrated on the respective surfaces of the upper 22 and lower 23 walls of the chamber 20 and contribute to increasing the heat exchange surface between the accumulators 11 of the battery 1 and the phase-change material 21 on the one hand and between the phase-change material 21 and the ambient air on the other hand and thus make it possible to increase the thermal conductivity of the system. These fins 220, 230 extend preferably transversely relative to the longitudinal direction of the chamber 20 covering the lower face of the battery 1.

The storage means 20 thus use the latent heat of melting of the phase-change material 21 in order to store the thermal energy generated by the battery. By way of example, that is to say a vehicle consuming a power of approximately 20 kW at 100 km/h. The thermal power generated by the battery whilst it provides 20 kW is approximately 500 W. This thermal power represents a thermal energy to be removed of 250 Wh for a travel time of half an hour, therefore in order to cover 50 km. This thermal energy is equivalent to the storage capacity by latent heat of 5 kg of paraffin. In other words, in this case, the melting of the paraffin would be sufficient to absorb the heat produced by the battery. It has been demonstrated that the change in phase of the material results in a variation of the density and therefore volume thereof. In the present case, since the density of the paraffin in liquid phase is 0.76 kg/l, the volume corresponding to 5 kg of paraffin in liquid phase is 7 liters. Once solidified, this will occupy a volume of 6 liters (density 0.88 kg/l in solid phase). Also, 5 kg of phase-change material 21 in accordance with said example passes from 7 L in liquid phase to 6 L in solid phase. The chamber 20 surrounding the phase-change material 21 must therefore be able to cope with a variation in volume of 1 L without changing the thermal efficacy of the system nor harming the integrity of the battery 1.

Firstly, so as not to alter the thermal efficacy of the system, it is necessary to permanently keep the phase-change material 21 in contact with the two heat exchange surfaces 22 and 23, respectively on the side of the module 12 of the battery 1 and on the outer side of the battery 1, moreover in spite of the change in volume of the material 21 during the phase change. In other words, irrespective of the current phase of the phase-change material 21, the chamber 20 surrounds the material 21 whilst maintaining the contact of the material with all the heat exchange surfaces, i.e. on the module side and on the outer side.

To do this, the chamber 20 is provided at its distal end 24 with an expansion vessel 200 able to absorb the expansions of the material 21 during the phase change thereof. The expansion vessel 200 is raised relative to the chamber 20 and has an internal volume which extends substantially perpendicularly to the heat exchange volume of the chamber 20, which in turn extends substantially horizontally opposite the lower face of the battery 1, surrounding the phase-change material 21. More precisely, the internal volume of the expansion vessel 200 extends the heat exchange volume of the chamber 20 from a lower end 201 of the vessel 200 to a closed upper end 202 opposite said lower end 201.

In this configuration the expansion vessel 200 is dimensioned on the one hand such that, in solid phase, the material 21 fully fills the heat exchange volume delimited by the upper 22 and lower 23 walls of the chamber 20, without filling the internal volume of the expansion vessel 200, or at the least only partially filling said volume up to a first level 203, referred to as the low level, and on the other hand such that, in liquid phase, the material 21 can expand, filling the internal volume of the expansion vessel 200 up to a second level 204, referred to as the high level, but without the material 21 being able to reach the upper end 202 of the vessel 200 when in liquid phase. In this way, the material 21, whether in liquid phase or in solid phase, is always in contact with all of the heat exchange surfaces of the upper 22 and lower 23 walls of the chamber 20, respectively on the side of the modules 12 of the battery 1 and on the outer side of the battery 1.

In addition, the interior of the expansion vessel 200 communicates with the exterior via a channeling 205 which is open to the ambient air and is arranged in the upper part of the expansion vessel 200, substantially in the proximity of the closed upper end 202 of the expansion vessel 200. This connection to the ambient air provided in the upper part of the vessel 200 advantageously makes it possible to balance the pressures generated by the change in volume of the phase-change material 21. This balancing of pressures prevents any disturbance of the phase change of the material 21, which is sensitive to pressure, and thus ensures good thermal efficacy of the system. In addition, the balancing of the pressures prevents the creation of excessive stresses at the upper 22 and lower 23 walls and therefore prevents any harm to the integrity of the battery.

The channeling 205 open to the ambient air may advantageously be connected to a conduit 206 able to raise the connection to the ambient air. In particular, this conduit 206 may be designed in order to raise the connection to the ambient air to a height sufficient to prevent the escape of the phase-change material 21 under the effects of inclination and acceleration of the vehicle.

FIG. 2 illustrates the development over time (in minutes) of the temperature curves C1 and C2 respectively of the cells 11 of the battery 1 and of the phase-change material 21 during use of the vehicle involving the supply of electrical power by the battery and therefore production of heat. As can be seen in FIG. 2, whilst the temperature at the point of contact between the cells and the metal casing 10 of the battery 1 forming the upper wall 22 of the chamber 20 surrounding the phase-change material 21 is lower than the melting point of the phase-change material 21, the transfer of heat from the cells 11 to the phase-change material 21 will be implemented by sensible heat, and therefore the temperature of the phase-change material 21 will rise whilst remaining lower than the temperature of the cells 11. By contrast, once the melting point of the phase-change material 21 has been reached, said material will undergo a phase change from solid phase to liquid phase (start of the melting of the material) at constant temperature. It is this phase change which constitutes the essence of the capacity of heat absorption by the phase-change material 21. If all the phase-change material 21 is melted, the temperature of the phase-change material 21 will rise again. If the temperature of the cells 11 reaches an upper temperature threshold S corresponding to the "derating" temperature, it will be necessary to proceed with the "derating" of the battery, i.e. with a limitation of the power demanded of the battery, in order to reduce the generated heat.

As illustrated in FIG. 3, when the battery is no longer being used, the transfer of heat from the cells 11 of the battery to the phase-change material 21 no longer taking place, the phase change occurs in the opposite direction and the material 21 will then undergo a phase change from liquid phase to solid phase (start of the solidification of the material) with the transfer of heat this time from the material 21 to the cells 11 of the battery 1 and to the exterior of the battery 1, i.e. the ambient environment. This allows the phase-change material 21 to regenerate itself and at the same time to limit the decrease in the temperature of the cells 11 in cold conditions. In fact, in this figure, the latent heat accumulated by the phase-change material 21 during the operation of the vehicle will be transmitted to the cells 11 of the battery 1 when the vehicle is not being used, thus contributing to keeping the battery 1 in the correct temperature range.

FIG. 4 illustrates an embodiment in which an active cooling system 3, preferably a circuit that cools by air 31, is combined with the previously described thermal storage means 2, implementing a passive cooling of the battery with use of the latent heat of melting of a phase-change material in order to regulate the temperature of the battery. In accordance with this embodiment the heat produced by the cells 11 is transmitted not only to the thermal storage means 2, as explained beforehand with reference to FIG. 1, but also to the cooling fluid (air) implemented by the active cooling system 3. The circuit for cooling by air 31 will not be detailed here, and is well known in the prior art. Typically, a fan motor, installed at the battery and powered by the electrical network of the vehicle, creates a flow of air that passes through the battery and escapes via orifices provided for this purpose. As the air flows through the battery the temperature of the air rises due to the heat transferred by the cells of the battery, by convection.

With this configuration combining an active cooling system 3 with the thermal storage means 2, an advantageous control of the thermal regulation of the battery 1 can be implemented, illustrated with reference to FIG. 5, which shows, in this configuration, the development of the temperature curves C1 and C2 respectively of the cells 11 of the battery 1 and of the phase-change material 21 when the battery is in operation. As in the previous case, the temperature of the cells 11 is stabilized at the melting point of the phase-change material 21 as long as the material 21 has not entirely changed phase. After the complete melting of the phase-change material 21, the temperature of the cells 11 and that of the phase-change material 21 will rise. Once a first temperature threshold of the cells (threshold1), preferably 40° C., has been reached, this threshold temperature being lower than the upper temperature threshold S corresponding to the "derating" temperature, the active cooling system 3 is activated by the BMS (battery management system), which is present as is known in electric vehicles and which monitors in particular the temperature of the battery. Upon reaching a second temperature threshold of the cells (threshold2), which is lower than the first threshold and is preferably equal to 38° C., the active cooling system 3 is stopped until the temperature of the cells again reaches the first threshold (threshold1). It is noted that, as is known, the BMS already knows the temperature of the cells thanks to temperature sensors. The flowchart in FIG. 6 illustrates the control of the active cooling means for the thermal regulation of the battery, which has just been described.

This method for controlling the active cooling system has a number of advantages:

Because the temperature of the cells remains below the "derating" temperature, the performances of the vehicle are not adversely influenced.

Because the temperature of the cells is held below the first threshold, preferably 40° C., the service life of the battery is not adversely influenced.

The consumption of the active cooling means is reduced to a minimum. In fact, the temperature of the battery is held between the first and second temperature thresholds, but there is no attempt for a further reduction, which would significantly increase the consumption, in particular because the heat stored in the phase-change material would be used.

As in the previous embodiment without active cooling, when the vehicle is no longer being used, the phase change of the phase-change material occurs in the opposite direction, i.e. from the liquid phase to the solid phase, with a transfer of heat stored in the phase-change material to the cells of the battery and to the ambient environment, enabling the phase-change material to regenerate itself as in the previous case.

In the embodiment combining the active cooling system with the thermal storage means including the phase-change material, the operating mode for controlling the active cooling system could advantageously be modified so as to lower the temperature of the cells and therefore that of the phase-change material whilst the vehicle is connected to a recharging terminal of the battery. The active cooling system will be activated typically in order to lower the temperature of the cells and that of the phase-change material substantially to ambient temperature. This has the advantage of starting again with a completely regenerated phase-change material. The resultant consumption associated with the active cooling system does not affect the autonomy of the vehicle, since the electrical energy does not come from the battery, but the recharging terminal.

The invention claimed is:

1. A device for the thermal management of a battery of electric accumulators assembled within a rigid casing, said device comprising:

thermal storage means integrated with said battery, the thermal storage means including:

a chamber containing a phase-change material and having a volume for exchange of heat with said accumulators which is delimited by at least part of said rigid casing, the melting of the phase-change material being able to store heat, and the solidification of the phase-change material being able to release the heat previously stored, and an expansion vessel, at a distal end of said chamber, able to absorb expansions of said phase-change material as the phase-change material changes phase, wherein an upper wall made of a heat-conducting material, which is formed by said at least one part of said rigid casing, forms a first surface for exchange of heat with said accumulators, wherein none of said accumulators are inside said chamber, wherein the rigid casing and the upper wall of said chamber are between said accumulators and the volume for exchange of heat, wherein said upper wall is entirely below the accumulators and supports a bottom face of the battery, and wherein said first surface covers an entirety of the bottom face of the battery.

2. The device as claimed in claim 1, wherein said expansion vessel is raised relative to said chamber and has an internal volume extending the volume for exchange of heat of said chamber from a lower end of said expansion vessel to an upper closed end of said expansion vessel, which is opposite said lower end.

3. The device as claimed in claim 1, wherein an interior of said expansion vessel is in communication with an exterior by means of a channeling open to ambient air, said channeling being arranged in an upper part of said expansion vessel.

4. The device as claimed in claim 3, wherein said channeling open to the ambient air is connected to a conduit able to raise a connection to the ambient air.

5. The device as claimed in claim 1, wherein a lower wall made of a heat-conducting material is disposed opposite said upper wall so as to close the volume for exchange of heat, said lower wall forming a second surface for exchange of heat with an exterior of said battery.

6. The device as claimed in claim 5, wherein said chamber includes heat exchange fins integrated on the first surface of said upper wall of said chamber and on the second surface of said lower wall of said chamber.

7. The device as claimed in claim 1, further comprising an active cooling system including a cooling circuit installed in said battery, equipped with means for circulating a cooling fluid through said battery.

8. The device as claimed in claim 7, wherein the active cooling system further includes control means, said control means controlling activation of said active cooling system when a temperature of said accumulators reaches a first temperature threshold (threshold1) greater than a melting point of said phase-change material and able to control the stopping of said active cooling system when the temperature of said accumulators reaches a second temperature threshold (threshold2) between the melting point of said phase-change material and said first threshold (threshold1).

9. The device as claimed in claim 1, wherein the melting point of said phase-change material is approximately 35° C.

10. The device as claimed in claim 1, wherein said phase-change material is or includes paraffin.

* * * * *